(12) United States Patent
Imming

(10) Patent No.: US 6,260,089 B1
(45) Date of Patent: Jul. 10, 2001

(54) METHOD AND APPARATUS FOR IMPLEMENTING CONNECTIONS WITH CIRCUITS

(75) Inventor: Kerry Christopher Imming, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/199,596

(22) Filed: Nov. 25, 1998

(51) Int. Cl.[7] ...................................................... G06F 13/00
(52) U.S. Cl. .......................... 710/102; 361/600; 361/679; 361/760; 361/788
(58) Field of Search ...................................... 710/102, 100, 710/101, 103, 2; 395/500.01, 500.02, 500.09, 500.1; 361/600, 679, 728, 733, 736, 737, 748, 760, 788

(56) References Cited

U.S. PATENT DOCUMENTS

| | | | |
|---|---|---|---|
| 5,260,854 | * 11/1993 | Hileman et al. | 361/736 |
| 5,502,621 | * 3/1996 | Schumacher et al. | 361/760 |
| 5,701,234 | * 12/1997 | Wong | 361/773 |
| 5,973,935 | * 10/1999 | Schoenfeld et al. | 361/813 |
| 6,038,130 | * 3/2000 | Boeck et al. | 361/735 |
| 6,043,992 | * 3/2000 | Scheibler | 361/728 |
| 6,052,289 | * 4/2000 | Schoenfeld et al. | 361/813 |
| 6,102,743 | * 8/2000 | Haffenden et al. | 439/630 |

* cited by examiner

Primary Examiner—Xuan Thai
(74) Attorney, Agent, or Firm—Joan Pennington

(57) ABSTRACT

A method and apparatus are provided for implementing connections with circuits, such as very large scale integrated (VLSI) semiconductor integrated circuits. A physical connection assignment arrangement includes a plurality of connections, each having predefined, dual functions. A control signal identifies an orientation of the physical connection assignment arrangement. A selector logic circuit contained within the circuit is coupled to the plurality of predefined, dual function connections. The selector logic circuit receives the control signal and responsive to the control signal, selects one of the predefined dual functions for each of the plurality of connections.

20 Claims, 5 Drawing Sheets

FIGURE 1
PRIOR ART
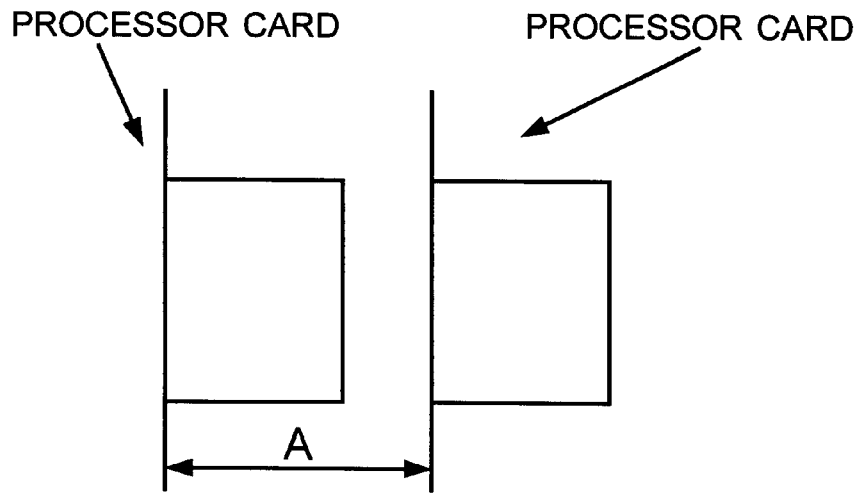
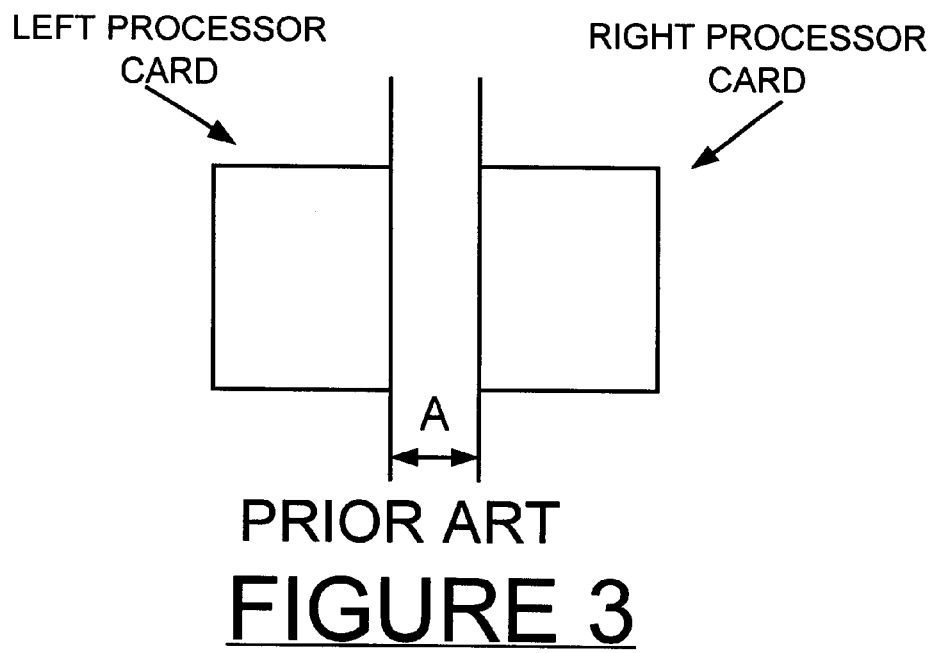
PRIOR ART
FIGURE 3

METHOD AND APPARATUS FOR IMPLEMENTING CONNECTIONS WITH CIRCUITS

FIELD OF THE INVENTION

The present invention relates generally to the data processing field, and more particularly, relates to a method and apparatus for implementing connections with circuits, such as very large scale integrated (VLSI) semiconductor integrated circuits.

DESCRIPTION OF THE RELATED ART

FIG. 1 illustrates a prior art arrangement of processor cards. Today the profile of processor cards is increasing due to the increased heat sink size required to cool the faster processors. FIGS. 2 and 3 illustrate processor cards that are inserted back-to-back. Note the wiring problem created in FIG. 2 when the cards are inserted back-to-back without any special card design. In order to keep backplane busses as short as possible, two unique processor cards, a right and left-handed version of the processor card are required as illustrated in FIG. 3.

U.S. Pat. No. 5,701,234 discloses a surface mount component which can be mounted on the surface of a printed circuit board (PCB) in a selected one of a plurality of different positions. The surface mount component includes a puck having first and second wiring patterns and a plurality of electrical connectors. A first set of connectors is connected to the first wiring pattern and a second set of connectors is connected to a second wiring pattern. During the manufacturing process, a worker mounts the puck to a printed circuit board in a selected one of a plurality of different positions, with selected ones of the first and second sets of connectors being connected to respective ones of a plurality of bonding pads on the printed circuit board.

A need exists for an improved mechanism for implementing connections with circuits, such as very large scale integrated (VLSI) semiconductor integrated circuits.

SUMMARY OF THE INVENTION

A principal object of the present invention is to provide an improved method and apparatus for implementing connections with circuits, such as very large scale integrated (VLSI) semiconductor integrated circuits. Other important objects of the present invention are to provide such method and apparatus for implementing connections with circuits substantially without negative effects and that overcome some disadvantages of prior art arrangements.

In brief, a method and apparatus are provided for implementing connections with circuits, such as very large scale integrated (VLSI) semiconductor integrated circuits. A physical connection assignment arrangement includes a plurality of connections, each having predefined, dual functions. A control signal identifies an orientation of the physical connection assignment arrangement. A selector logic circuit contained within the circuit is coupled to the plurality of predefined, dual function connections. The selector logic circuit receives the control signal and responsive to the control signal, selects one of the predefined dual functions for each of the plurality of connections.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1, 2 and 3 illustrate prior art processor card arrangements;

DETAILED DESCRIPTION OF THE PREFERRED EMBODIMENTS

Figure 2:
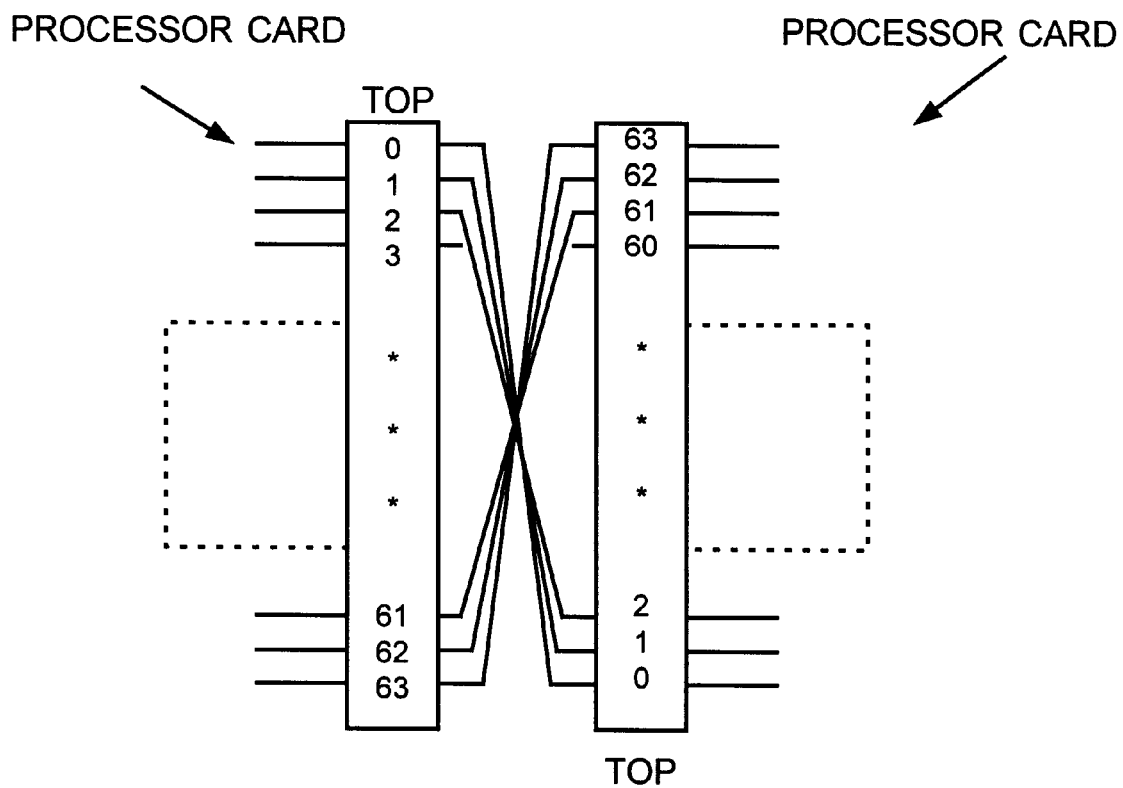
Figure 4:
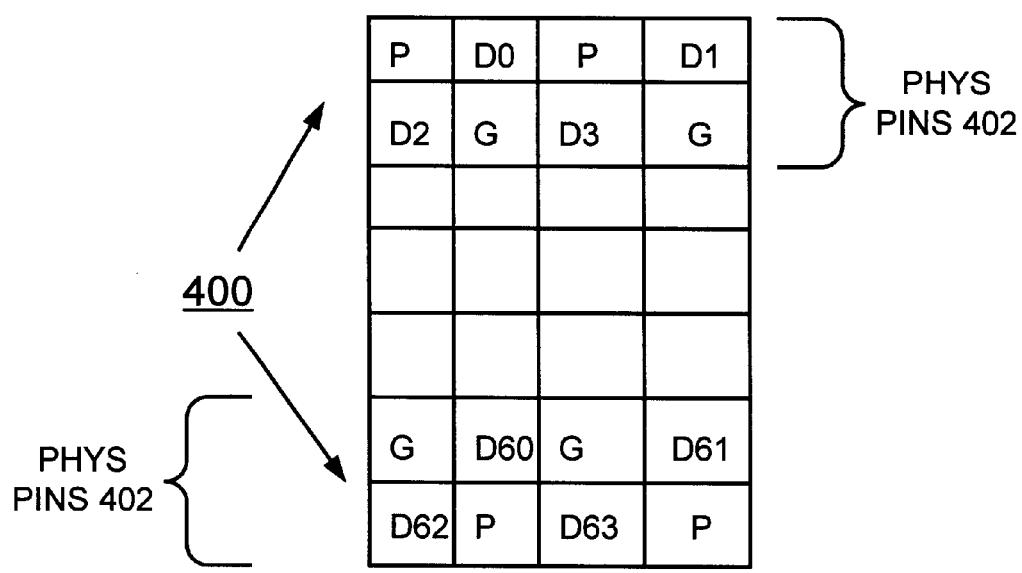
FIG. 4 is a diagram illustrating physical connection assignments in accordance with the preferred embodiment.

Having reference now to the drawings, in FIG. 4 there is shown a physical connection assignment arrangement generally designated by the reference character 400 and arranged in accordance with the present invention. In accordance with features of the invention, the physical connection assignment arrangement 400 of multiple physical connections or pins 402 defines each of the signal pins D1, D2, D3, D61, D62, D63, for example, on the backplane connector, for one of two possible uses, depending on whether the card is plugged in to a right or left-handed slot. The selection for the function of each signal connector pin D1, D2, D3, D61, D62, D63 is made with selection logic circuitry 500 illustrated and described with respect to FIG. 5. The combination of the physical connection assignment arrangement 400 and selection logic circuitry 500 of the invention moves wiring congestion off of the backplane as illustrated in FIG. 2 and removes the need for a pair unique processor cards conventionally used to handle the reversed connector situation as illustrated in FIG. 3.

Physical connection assignment arrangement 400 of the invention assigns the connector pins 402 in a mirror image layout as illustrated in FIG. 4. The signal pins 402 are defined for example, such that the signal pins 402 D0 of a first connector is connected to card pin D0 in the mating connector 400 when placed upright and is connected to signal pin D63 with the mating connector 400 rotated by 180 degrees or flipped vertically. Flipping the connector 400 by 180 degrees results in the power (P) and ground (G) pins 402 connecting correctly, while each of the signal pins 402 on the card would connect to one of two predefined signals. For example as illustrated in FIG. 4, one of D0 or D63, D1 or D62, D2 or D61 is connected to a respective connection D0, D1, or D2 depending on a selected first or second orientation (such as, left or right) of the mating connector. In general, each signal pin 402 is assigned two functions, with one function selected by the left or right orientation of the connection. A pair of shared, dual function signal pins 402, such as D0/D63 and D63/D0 are defined for all of the signal pins 402, used with selection logic 500 as illustrated in FIG. 5.

Figure 5:
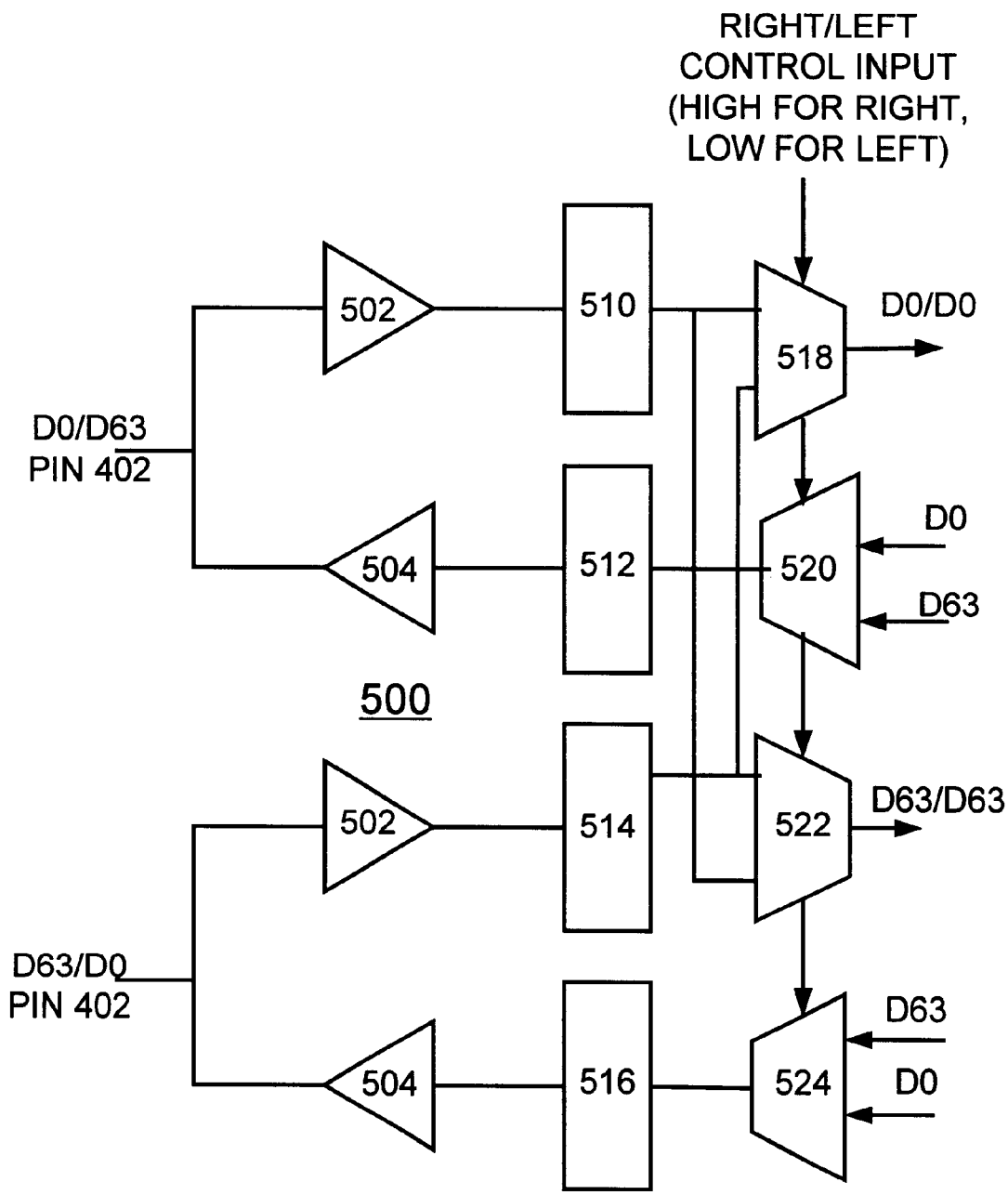
FIG. 5 is a diagram illustrating exemplary selector logic in accordance with the preferred embodiment.

FIG. 5 shows an exemplary implementation for the selector logic generally designated by 500 and arranged in accordance with the preferred embodiment. FIG. 5 shows a pair of shared dual function signal pins 402 D0/D63 and D63/D0. The dual function signal pins 402, such as processor card connector pins, are routed directly into a chip containing selector logic 500, such as a processor chip. A right/left control signal RIGHT/LEFT is used to select the correct function for each dual function signal pin 402. Selector logic 500 includes a receiver 502 and a driver 504 coupled to each of the dual function signal pins 402 D0/D63, D63/D0. Each receiver 502 and each driver 504 is connected to a respective latch 510, 512, 514, 516 in the data flow path. Selector logic 500 includes a respective multiplexer 518, 520, 522, 524 connected with each latch 510, 512, 514, 516 in the data flow path, as shown. Internal to a particular chip containing selector logic 500, the signals are routed to the correct function based on the control signal RIGHT/LEFT applied to each of the multiplexers 518, 520, 522, 524 that indicates the connection's orientation, for example, whether the card is in a right or left-hand slot. First and second inputs to multiplexer 518 are the respective latched outputs of latches 510 and 514 coupled to receivers 502. First and second inputs to multiplexer 520 are the respective latched outputs of latches 514 and 510 coupled to receivers 502. First and second inputs to multiplexers 520 and 522 coupled to the respective inputs of latches 512 and 516 coupled to the drivers 504 are respective data signals 0, 63 and 63, 0.

As shown in FIG. 5, the selection logic 500 is kept out of the critical delay paths with selection by multiplexers 518 and 522 being done after the data signals are latched by latches 510 and 514 for receiver connections and selection by multiplexers 520 and 524 is done before being latched by latches 512 and 516 for driver connections.

The selector signal RIGHT/LEFT can be programmed by a service processor (not shown) at initial program load (IPL) time, or a card pin could be assigned that is connect to power (pulled-up) if the card is mounted in a right hand slot and connected to ground (pulled-down) if the card is mounted in a left-hand slot. The latter solution would require an extra chip input to handle the selection signal.

Connection pin arrangement 400 and selection logic 500 work best for large busses, but the shared pins 402, such as D0/D63, D63/D0 are not required to be part of the same bus. Shared pins that are not part of busses can be handled by backplane wiring. Keeping these signals pins near the center of the connector minimizes the wiring congestion. It should be understood that correct I/O placement would keep the multiplexed drivers and receivers 502 and 504 physically close so that extra wiring is localized. When the multiplexing is done on the inboard side of the driver/receiver latches 510, 512 and 514, 516 as shown in FIG. 5, the multiplexing is provided without impacting any critical timing paths.

Figure 6:
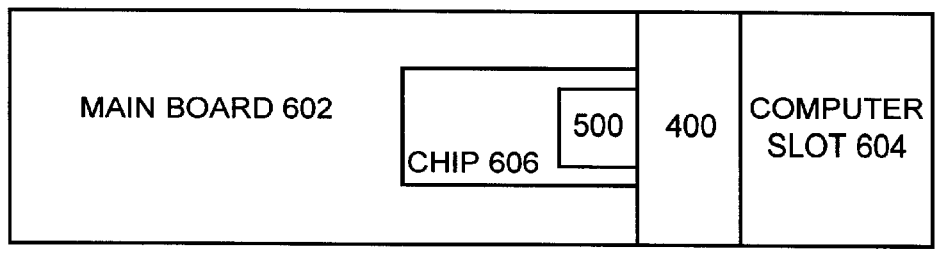
FIGS. 6, 7, 8 are diagrams illustrating exemplary applications for the physical connection assignments of FIG. 4 and the selector logic of FIG. 5 of the preferred embodiment.
Figure 7:
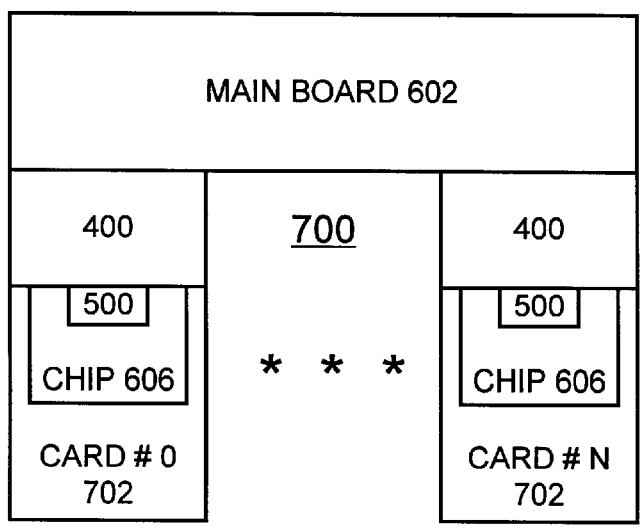
Figure 8:
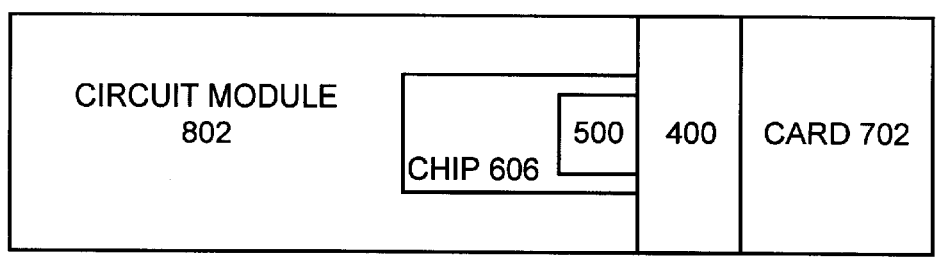

FIGS. 6, 7 and 8 illustrate exemplary applications for the connection arrangement 400 and selection logic circuitry 500 of the preferred embodiment. In FIG. 6, a first application generally designated 600 includes a main board 602 connected to a computer slot 604 via the connection arrangement 400 and selection logic circuitry 500. The selection logic circuitry 500 is contained inside a chip 606 on the main board 602. Typically chip 606 is a very large scale integrated (VLSI) semiconductor integrated circuit chip. The dual function signal pins 402 of the connection arrangement 400 are routed directly into the chip 606 containing selector logic 500.

In FIG. 7, a second application generally designated 700 includes a plurality of cards (0–N) 702, each connected to a main board 602 via the connection arrangement 400 and selection logic circuitry 500. Each of the cards 702 includes a chip 606 containing selection logic circuitry 500. The dual function signal pins 402 of the connection arrangement 400 are routed directly into the chip 606 containing selector logic 500. The application 700 of FIG. 7 eliminates the need for two unique card designs required in the conventional arrangement of FIG. 3, saving money in design time, manufacturing costs, and fewer unique part numbers to stock for field replacements. Application 700 allows the use of a single card design 702 to implement for example, back-to-back processors card connections to the main board 602.

In FIG. 8, other applications generally designated 800 includes a module 802 connected to a circuit card 702 via the connection arrangement 400 and selection logic circuitry 500. A chip 606 contained within the module 802 contains the selection logic circuitry 500. The dual function signal pins 402 of the connection arrangement 400 are routed directly into the chip 606 containing selector logic 500.

It should be understood that the present invention is not limited to the illustrated applications 600, 700 and 800 of FIGS. 6, 7, and 8. For example, the invention could be applied to any board that has multiple instances of a device installed in different orientations as long as the device includes the selection logic 500 to route the bits based on its connection slot orientation with connection arrangement 400.

While the present invention has been described with reference to the details of the embodiments of the invention shown in the drawing, these details are not intended to limit the scope of the invention as claimed in the appended claims.

What is claimed is:

1. Apparatus for implementing connections with a circuit comprising:
   a physical connection assignment arrangement including a plurality of connections, each having predefined, dual functions;
   a control signal identifying an orientation of said physical connection assignment arrangement; and
   a selector logic circuit contained within the circuit coupled to the plurality of predefined, dual function connections of the physical connection assignment arrangement; said selector logic circuit receiving said control signal and selecting one of said predefined dual functions for said plurality of connections responsive to said control signal.

2. Apparatus for implementing connections with a circuit as recited in claim 1 wherein said physical connection assignment arrangement including said plurality of connections, each having predefined, dual functions includes said plurality of connections having a mirror image layout for said predefined, dual functions.

3. Apparatus for implementing connections with a circuit as recited in claim 1 wherein said physical connection assignment arrangement includes said plurality of connections 0 through N including multiple pairs of mirror image shared function connections.

4. Apparatus for implementing connections with a circuit as recited in claim 3 wherein said multiple pairs of mirror image shared function connections include a pair of mirror image shared function connections defining dual data signal functions 0, N and N, 0.

5. Apparatus for implementing connections with a circuit as recited in claim 1 wherein said control signal identifying said orientation of said physical connection assignment arrangement includes a high logic level indicating a first orientation of said physical connection assignment arrangement and a low logic level indicating a second orientation of said physical connection assignment arrangement.

6. Apparatus for implementing connections with a circuit as recited in claim 4 wherein said wherein said first and said second orientations of said physical connection assignment arrangement are rotated apart by 180 degrees.

7. Apparatus for implementing connections with a circuit as recited in claim 1 wherein said selector logic circuit includes a plurality of multiplexers, each multiplexer receiving said control signal identifying said orientation of said physical connection assignment arrangement.

8. Apparatus for implementing connections with a circuit as recited in claim 1 wherein said selector logic circuit includes a plurality of receivers, and one said receiver being connected to a respective one of said plurality of connections.

9. Apparatus for implementing connections with a circuit as recited in claim 1 wherein each said receiver is coupled to an input of a multiplexer by a latch, said multiplexer receiving said control signal identifying said orientation of said physical connection assignment arrangement.

10. Apparatus for implementing connections with a circuit as recited in claim 1 wherein said selector logic circuit includes a plurality of drivers, and one driver being connected to a respective one of said plurality of connections.

11. Apparatus for implementing connections with a circuit as recited in claim 1 wherein each said driver is coupled to an output of a multiplexer by a latch, said multiplexer receiving said control signal identifying said orientation of said physical connection assignment arrangement.

12. Apparatus for implementing connections with a circuit as recited in claim 1 wherein said selector logic circuit includes a plurality of receivers, a plurality of drivers, and one said receiver and one said driver being connected to a respective one of said plurality of connections.

13. Apparatus for implementing connections with a circuit as recited in claim 12 further includes a corresponding latch connected to each of said plurality of receivers and a corresponding latch connected to each of said plurality of drivers.

14. Apparatus for implementing connections with a circuit as recited in claim 13 further includes a corresponding multiplexer connected in a signal path with each said latch.

15. Apparatus for implementing connections with a circuit as recited in claim 1 wherein said circuit is a very large scale integrated (VLSI) semiconductor integrated circuit chip and wherein said selector logic circuit is contained within said VLSI semiconductor integrated circuit chip.

16. Apparatus for implementing connections with a circuit as recited in claim 1 wherein said circuit is provided on a main board, said main board including said connection arrangement for connection with a computer slot, and said selection logic circuitry is included with said main board.

17. Apparatus for implementing connections with a circuit as recited in claim 1 wherein said circuit is provided on a card, said card including said connection arrangement for connection with a main board, and said selection logic circuitry is included with said card.

18. Apparatus for implementing connections with a circuit as recited in claim 1 wherein said circuit is provided on a module, said module including said connection arrangement for connection with a circuit card, and said selection logic circuitry is included with said module.

19. A method for implementing connections with a circuit comprising the steps of:
providing a physical connection assignment arrangement including a plurality of connections with each of said plurality of connections having predefined, dual functions;
receiving a control signal identifying an orientation of said physical connection assignment arrangement; and
applying said control signal to a selector logic circuit contained within the circuit, said selector logic circuit being connected to said plurality of predefined, dual function connections of the physical connection assignment arrangement;
utilizing said selector logic circuit responsive to said control signal for selecting one of said predefined dual functions for said plurality of connections.

20. The method for implementing connections with a circuit as recited in claim 19 includes the step of providing said physical connection assignment arrangement including said plurality of connections with each of said plurality of connections having predefined, dual functions with a mirror image layout.

* * * * *